United States Patent [19]

Kurihara et al.

[11] 4,260,285
[45] Apr. 7, 1981

[54] OIL BOOM

[75] Inventors: Mamoru Kurihara; Kiyoshi Ezaki; Haruo Takahashi, all of Yokohama, Japan

[73] Assignee: Bridgestone Tire Co., Ltd., Tokyo, Japan

[21] Appl. No.: 935,418

[22] Filed: Aug. 22, 1978

[30] Foreign Application Priority Data

Aug. 25, 1977 [JP] Japan .................... 52/112874[U]

[51] Int. Cl.³ ............................................. E02B 15/04
[52] U.S. Cl. ......................................... 405/68; 405/72
[58] Field of Search .................... 405/26, 63, 68, 72

[56] References Cited

U.S. PATENT DOCUMENTS

| | | | |
|---|---|---|---|
| 3,577,879 | 5/1971 | Ducrocq ............................. | 405/72 |
| 3,638,430 | 2/1972 | Smith ................................. | 405/72 X |
| 3,708,982 | 1/1973 | Blockwick ......................... | 405/72 X |
| 3,848,417 | 11/1974 | Smith et al. ...................... | 405/72 X |
| 4,084,380 | 4/1978 | Hallhagen ......................... | 405/68 |

Primary Examiner—David H. Corbin
Attorney, Agent, or Firm—Sughrue, Rothwell, Mion, Zinn and Macpeak

[57] ABSTRACT

An integrally molded oil boom comprising a float hose portion, a fin portion and a skirt portion is disclosed. In the oil boom, these portions are reinforced with a bias cut weave fabric.

4 Claims, 5 Drawing Figures

OIL BOOM

BACKGROUND OF THE INVENTION

1. Field of the Invention

This invention relates to an improvement of an oil boom to be deployed on water surface for preventing drift oil from dispersing beyond a limited area.

2. Description of the Prior Art

Heretofore, oil booms of various types have been proposed in order to prevent the dispersing of drifting oil floating on water surface. One of these techniques uses an integrally molded oil boom manufactured by uniting a float hose member with a fin member and a skirt member and reinforcing these members with a plain weave fabric. However, this integrally molded oil boom is such that its rigidity increases in the widthwise direction of the boom as compared with conventional oil booms manufactured by separately molding the float hose member, fin member and skirt member together. As a result, the surf-riding performance of such an oil boom is deteriorated and hence waves are apt to get over the boom so as to disperse the drifting oil beyond the area defined by the oil boom line. Particularly, when this oil boom is used as a selectively immersible oil boom, buckling of the float hose member is caused by a slight external force, resulting in sinking of the boom. That is, the integrally molded oil boom as described above does not function sufficiently as an oil boom.

SUMMARY OF THE INVENTION

It is, therefore, an object of the invention to eliminate the aforementioned drawbacks of the prior art and to provide a novel integrally molded oil boom which improves the surf-riding performance and prevents the occurrence of buckling.

According to the invention, there is provided an oil boom manufactured by integrally molding a float hose portion, a fin portion disposed on the upper part of the hose and a skirt portion disposed on the lower part of the hose and attaching a dead weight to the lower end of the skirt portion, characterized in that the float hose portion, fin portion and skirt portion are reinforced with a bias cut weave fabric.

BRIEF DESCRIPTION OF THE DRAWING

The invention will now be described in greater detail with reference to the accompanying drawings, wherein.

DESCRIPTION OF THE PREFERRED EMBODIMENT

Figure 1:
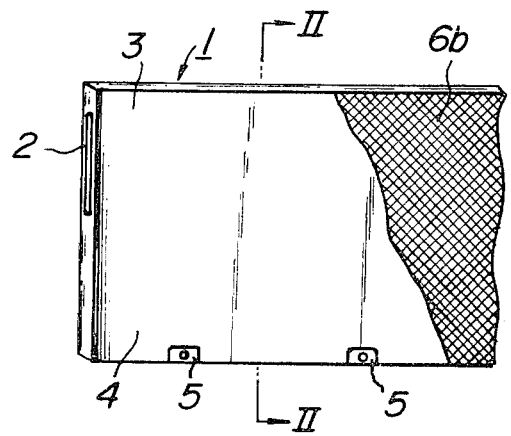
FIG. 1 is a partially cutaway perspective view of an embodiment of the oil boom according to the invention.
Figure 2:
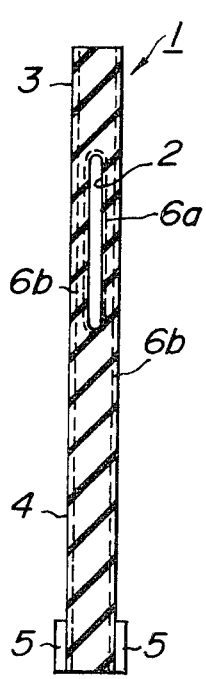
FIG. 2 is a cross sectional view taken along a line II—II of FIG. 1.

Referring to FIGS. 1 and 2, an oil boom according to the invention is generally represented by reference numeral 1. The oil boom 1 comprises an inflatable float hose portion 2 serving to float the boom, a fin portion 3 disposed on the upper part of the hose along its longitudinal direction and a skirt portion 4 disposed on the lower part of the hose along its longitudinal direction, these portions 2, 3 and 4 being integrally molded in a conventional manner. The material used for the formation of each portion is rubber, synthetic resin or the like. In the figure, reference numeral 5 represents dead weights attached to the lower end of the skirt portion 4 at proper intervals by bolts or the like.

According to the invention, the oil boom 1 of the above structure is reinforced with bias cut weave fabrics 6a, 6b. The bias cut weave fabric usually used a rubberized layer of cords each composed of organic fibers such as nylon, tetron and the like. The bias cut weave fabric 6a is arranged around the float hose portion 2 and the bias cut weave fabric 6b is arranged over widthwise directions of the fin portion 3 and the skirt portion 4 so as to put the float hose portion 2 between the two bias cut weave fabrics 6b, 6b. As shown in FIG. 2, each of the bias cut weave fabrics 6a, 6b is embedded at a predetermined position in the oil boom 1, but a plurality of each of the bias cut weave fabrics 6a, 6b, particularly even-numbered bias cut weave fabrics may be embedded considering the reinforcing effect and the stretchability of the boom.

Figure 3:
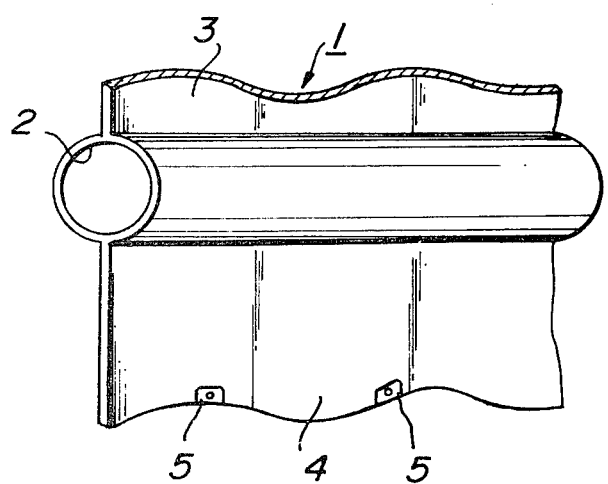
FIG. 3 is a perspective view illustrating an inflated state of the oil boom according to the invention.

The use of the bias cut weave fabrics 6a, 6b as a reinforcement for the oil boom 1 causes contraction of the float hose portion 2 to a certain extent along the longitudinal direction when the hose is inflated and as a result, the contracting force also acts on the fin portion 3 and the skirt portion 4, whereby pleats are formed on the fin portion 3 and the skirt portion 4 as shown in FIG. 3. Such a formation of pleats not only reduces the rigidity of the oil boom 1 in the widthwise direction, but also improves the surf-riding performance considerably.

Further, the bias cut weave fabrics 6a, 6b will stretch in longitudinal direction, so that if the oil boom is subjected to an external force, strain will be absorbed through the entire boom and the float hose portion 2 will rarely buckle.

The bias angle of the bias cut weave fabric can be varied depending upon the desired surf-riding performance of the oil boom and prevention of buckling and the like, but it is preferably within a range of 40° to 54°44′. When the bias angle is smaller than 40°, the contraction of the float hose portion upon inflation is considerably increased and causes extreme changes in the shape of the boom, while when the bias angle exceeds an angle of 54°44′, the contracting of the float hose portion is much less and as a result, the rigidity of the oil boom in the widthwise direction is not reduced and the surf-riding performance is deteriorated. If the degree of contraction of the float hose portion in the longitudinal direction is about 8%, the surf-riding performance of the oil boom is most effectively developed, which corresponds to the bias angle of about 48°.

The following experiments are conducted for showing the improvement of the surf-riding performance and the prevention of the buckling in the oil boom according to the invention. The bias angle of the bias cut weave fabric used is 45° corresponding to a degree of contraction of about 15% of the float hose portion.

EXPERIMENT 1

Effect of Preventing the Occurrence of the Buckling.

Figure 4:
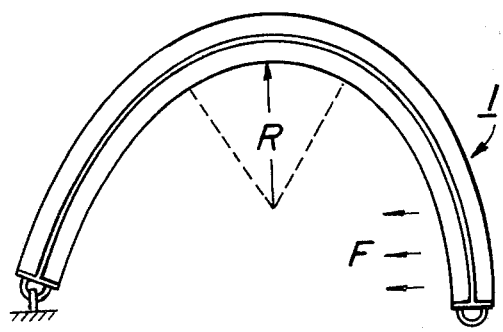
FIG. 4 is an illustration showing a method of Experiment 1 as described below.

The oil boom 1 was fixed at one end and bent at the other end by applying an external force F as shown in FIG. 4, whereby the bending radius R (mm) in the occurrence of the buckling was measured under various inflation pressures as shown in the following table.

This test was made with respect to an oil boom A reinforced with the bias cut weave fabric according to the invention and an oil boom B reinforced with the conventional plain weave fabric, each boom having a diameter of the float hose portion of 400 mm. The test results are shown in the table and in FIG. 5 wherein an ordinate is the bending radius R (mm) and an abscissa is the inflation pressure (kg/cm$^2$).

| Oil boom | Inflation pressure (kg/cm$^2$) | | | | | |
|---|---|---|---|---|---|---|
| | 0.30 | 0.45 | 0.75 | 1.00 | 1.35 | 2.25 |
| A : Bias cut weave fabric | (mm) 2,880 | 1,630 | 1,200 | 810 | — | — |
| B : Plain weave fabric | not measured | " | " | " | 4,800 | 3,030 |

Figure 5:
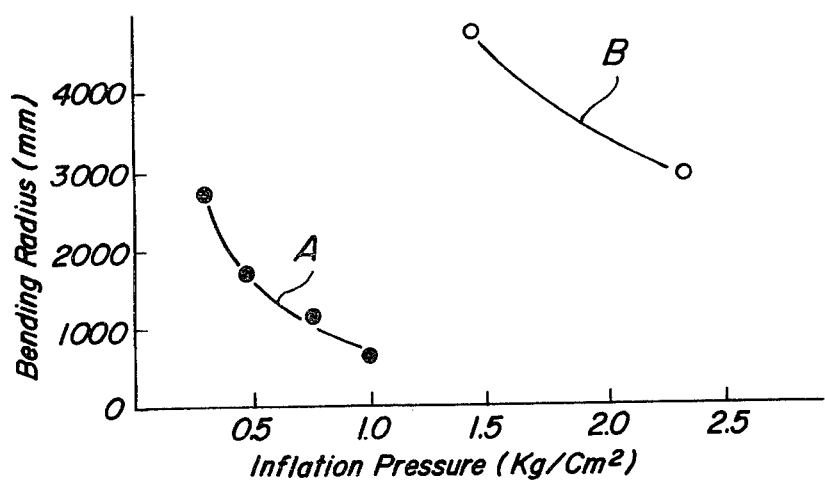
FIG. 5 is a graph showing a result of Experiment 1.

As seen from the data of the above table and FIG. 5, the oil boom reinforced with the bias cut weave fabric according to the invention hardly buckles as compared with the conventional oil boom reinforced with the plain weave fabric. In the table, the wording "not measured" means that the buckling is caused by slightly bending the boom. In general, the inflation pressure of the floating oil boom is about 0.5 kg/cm$^2$, so that the oil boom according to the invention is considerably effective for preventing the occurrence of the buckling.

EXPERIMENT 2

Surf-Riding Performance

The surf-riding performance of the oil boom was tested by deploying the oil boom in a large-size water tank, generating waves and then observing a movement in the vertical direction x of a midget lamp provided on the upper end of the fin portion. The surf-riding performance is evaluated by a surf-riding rate $\alpha$ expressed according to the following equation:

$$\text{Surf-riding rate } \alpha = \frac{\text{Movement in vertical direction of oil boom } (x)}{\text{Wave height } (H)}$$

The surf-riding rate $\alpha$ was measured by varying the wave gradient $\beta$-wave height (H)/wave length ($\lambda$) with respect to the same oil booms A and B used in Experiment 1. As a result, the surf-riding rate $\alpha$ of the oil boom A reinforced with the bias cut weave fabric according to the invention was not less than 0.5 at the wave gradient $\beta$ of 0.04 to 0.08, while that of the conventional oil boom B reinforced with the plain weave fabric was 0.03 at the wave gradient $\beta$ of 0.04 to 0.08. In general, it is known that the wave gradient $\beta$ in a bay is about 0.04 a normal state and more than 0.075 at an abnormal state. From this fact, it can be seen that the oil boom according to the invention considerably improves the surf-riding performance as compared with the conventional oil boom.

As mentioned above, the invention provides an integrally molded oil boom which prevents the occurrence of the buckling and improves the surf-riding performance by using a bias cut weave fabric as a reinforcement instead of the plain weave fabric usually used. Particularly, the oil boom according to the invention is very useful as a selectively immersible oil boom because sinking due to buckling is completely prevented.

What is claimed is:

1. An oil boom manufactured by integrally molding a float hose portion, a fin portion disposed on the upper part of said hose portion, and a skirt portion disposed on the lower part of said hose portion; said hose portion, said fin portion, and said skirt portion being reinforced with bias cut weave fabrics embedded therein; the lower end of said skirt portion having dead weights attached thereto at predetermined intervals; characterized in that said bias cut weave fabrics are located (i) circumferentially around said hose portion and (ii) disposed longitudinally over said hose portion, said fin portion and said skirt portion substantially from the upper edge of said fin portion to the lower edge of said skirt portion so as to position said hose portion and said bias cut weave fabrics located circumferentially around said hose portion between said longitudinally disposed bias cut weave fabrics; each said biased cut weave fabrics arranged substantially at an angle smaller than 54° 44′ with respect to the longitudinal direction of said oil boom.

2. An oil boom as claimed in claim 1, wherein said bias cut weave fabric has a rubberized layer of cords each composed of organic fibers.

3. An oil boom as claimed in claim 1, wherein said bias cut weave fabric has a bias angle of 40° to 54°44′.

4. The oil boom of claim 1, wherein said hose portion contracts upon inflation to thereby form pleats in said fin portion and said skirt portion.

* * * * *